(12) United States Patent
Fan et al.

(10) Patent No.: US 10,874,000 B2
(45) Date of Patent: Dec. 22, 2020

(54) DISPLAY DEVICE

(71) Applicant: Qisda Corporation, Taoyuan (TW)

(72) Inventors: Tse-Wei Fan, Taoyuan (TW); Fu-Tsu Yen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/784,390

(22) Filed: Feb. 7, 2020

(65) Prior Publication Data

US 2020/0260542 A1 Aug. 13, 2020

(30) Foreign Application Priority Data

Feb. 12, 2019 (CN) .......................... 2019 1 0110937

(51) Int. Cl.
| | |
|---|---|
| *H05B 45/10* | (2020.01) |
| *G09G 5/10* | (2006.01) |
| *H05B 47/18* | (2020.01) |
| *A63F 13/837* | (2014.01) |
| *A63F 13/52* | (2014.01) |

(52) U.S. Cl.
CPC .............. *H05B 45/10* (2020.01); *G09G 5/10* (2013.01); *H05B 47/18* (2020.01); *A63F 13/52* (2014.09); *A63F 13/837* (2014.09); *A63F 2300/30* (2013.01); *A63F 2300/8076* (2013.01)

(58) Field of Classification Search
CPC ........ H05B 45/00; H05B 45/10; H05B 47/00; H05B 47/10; H05B 47/12; H05B 47/18; G09G 5/18; G09G 5/30; A63F 2300/8076; A63F 13/52; A63F 13/837; A63F 2300/30
See application file for complete search history.

(56) References Cited

U.S. PATENT DOCUMENTS 10,636,385 B2 * 4/2020 Jung ...................... G06F 1/1605

\* cited by examiner

*Primary Examiner* — Jimmy T Vu

(57) ABSTRACT

A display device includes a display computing module coupled to a signal source and configured to receive an audio/video signal from the signal source; an audio computing module coupled to the display computing module, the audio computing module configured to receive the audio/video signal from the display computing module and to obtain a sound information including orientation data, the audio computing module outputting the sound information to enable the display computing module to generate a control signal based on the sound information; and a light source device coupled to the display computing module, the light source device including multiple light-emitting areas corresponding to the orientation data, the light source device configured to control a light-emitting status of at least one light-emitting area according to the control signal.

15 Claims, 7 Drawing Sheets

DISPLAY DEVICE

BACKGROUND OF THE INVENTION

1. Field of the Invention

The invention generally relates to a display technology. Particularly, the invention relates to a display device.

2. Description of the Prior Art

When an e-sports player plays a game, he/she generally needs to pay attentions to various dynamic activities. Once the message of dynamic activities in the game is missed, the gaming experience will be poor. The existing display pops out a prompt screen on the original display screen to the user during use, so the user must view the gaming screen and the prompt screen at the same time, resulting in distraction of the user from the game, degradation of the gaming experience, and less ideal prompt effect. Accordingly, the existing display device requires improvements.

Therefore, it is necessary to provide a display device to overcome the drawbacks mentioned above.

SUMMARY OF THE INVENTION

It is an object of the invention to provide a display device, which can provide prompts to the user without affecting the existing display screen.

In an embodiment, the invention provides a display device including a display computing module coupled to a signal source, an audio computing module coupled to the display computing module, and a light source device coupled to the display computing module. The display computing module is configured to receive an audio/video signal from the signal source. The audio computing module is configured to receive the audio/video signal from the display computing module and to obtain sound information including orientation data. The audio computing module outputs the sound information to enable the display computing module to generate a control signal based on the sound information. The light source device includes multiple light-emitting areas corresponding to the orientation data. The light source device is configured to control a light-emitting status of at least one of the light-emitting areas according to the control signal.

In an embodiment, the light source device includes a backlight module disposed corresponding to a display area; a backlight area of the backlight module includes a first region and a second region different from the first region; the first region corresponds to first direction information of the sound information; the second region corresponds to second direction information of the sound information; the first direction information is different from the second direction information; the backlight module controls display parameters of the first region or the second region according to the control signal.

In an embodiment, when the sound information is changed from the first direction information to the second direction information, the display computing module changes the control of the display parameters of the first region and the second region according to the change of the sound information.

In an embodiment, the light source device further includes a peripheral light source disposed on a housing around the display area, wherein a peripheral light-emitting area of the peripheral light source includes a first marginal region and a second marginal region corresponding to a first side and a second side of the housing, respectively. A brightness of the first marginal region varies with a brightness of the first region, and a brightness of the second marginal region varies with a brightness of the second region.

In an embodiment, the peripheral light-emitting area further includes a corner region corresponding to at least a corner of the housing, wherein the backlight area further includes a third region disposed neighboring the corner region; the third region corresponds to third direction information of the sound information; a brightness of the corner region varies with a brightness of the third region.

In an embodiment, the first marginal region includes a first section and a second section along the first side; the backlight area further includes a fourth region connected to the first region along the first side; the fourth region corresponds to fourth direction information of the sound information; a brightness of the first section varies with the brightness of the first region, and a brightness of the second section varies with a brightness of the fourth region.

In an embodiment, the peripheral light source is configured to display a regular tone and/or a warning tone. When the brightness of the first region increases, the first section of the first marginal region is changed from the regular tone to the warning tone.

In an embodiment, the display device further includes a bracket connected to the housing, wherein the peripheral light source is disposed on the housing and the bracket; the peripheral light-emitting area includes an indication region on the bracket; the backlight area includes a central region corresponding to central location information of the sound information; a brightness of the indication region varies with a brightness of the central region.

In an embodiment, the sound information further includes audio type data, wherein the display computing module generates the control signal according to the sound type data to enable the light source device to control a flashing frequency of at least one light-emitting area based on the control signal.

In an embodiment, the light source device includes a peripheral light source disposed on a housing around the display area, wherein a peripheral light-emitting area of the peripheral light source includes a first marginal region and a second marginal region corresponding to a first side and a second side of the housing, respectively. The first marginal region corresponds to first direction information of the sound information; the second marginal region corresponds to a second direction information of the sound information; display parameters of the first marginal region and/or the second marginal region are varied according to the control signal.

In an embodiment, the peripheral light-emitting area further includes a corner region corresponding to at least a corner of the housing, wherein the corner region corresponds to third direction information of the sound information, and display parameters of the corner region are varied according to the control signal.

In an embodiment, the first marginal region includes a first section and a second section along the first side. The first section corresponds to first direction information of the sound information; the second section corresponds to second direction information of the sound information, and display parameters of the first section and the second section are varied according to the control signal.

In an embodiment, the peripheral light source is configured to display a regular tone and/or a warning tone; when the light source device receives the control signal, the first section of the first marginal region is changed from the regular tone to the warning tone.

In an embodiment, the display device further includes a bracket connected to the housing, wherein the peripheral light source is disposed on the housing and the bracket; the peripheral light-emitting area includes an indication region on the bracket; the indication region corresponds to central location information of the sound information, and display parameters of the indication region are varied according to the control signal.

In an embodiment, the audio/video information includes a video signal and/or an audio signal, wherein after the audio computing module obtains the sound information from the audio signal, the sound information is sent to the display computing module through a communication bus.

Compared to the prior art, the display computing module and the audio computing module of the display device of the invention can generate the control signal corresponding to the audio/video signal from the signal source, such that the light source device of the display device can be modified with different light-emitting statuses according to the control signal. Therefore, the user can identify the prompt message according to the light-emitting status. The invention can prompt the user in a more direct manner, so the operation experience of the user can be improved.

DETAILED DESCRIPTION OF THE PREFERRED EMBODIMENT

In order to further understand the objects, structures, features, and functions of the invention, the following detailed description is given in conjunction with the embodiments.

Certain terms are used throughout the specification and the claims. Those of ordinary skill in the art should understand that manufacturers may refer to the same component by a different term. The specification and the claims do not distinguish elements by difference in names, but distinguish elements by difference in function. The term "including", "comprising" as used throughout the specification and the claims is an open term and should be interpreted as "including but not limited to".

The invention provides a display device 1, which can prompt the user according to the audio orientation by controlling the light source device 40 according to the orientation data of the audio/video signal, so that the user can be prompted by identifying the change of the display screen through different light-emitting statuses of the light source device 40.

Figure 1:
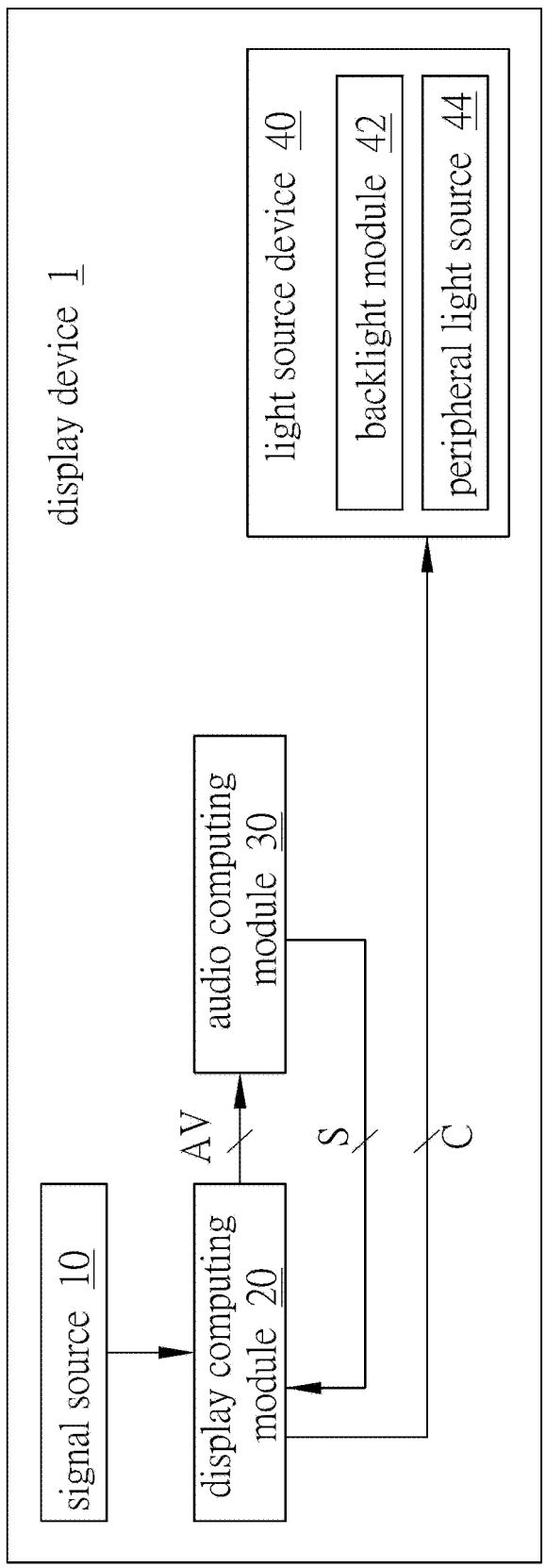
FIG. 1 is a block diagram of the display device of an embodiment of the invention.

Referring to FIG. 1, FIG. 1 is a block diagram of the display device 1 of an embodiment of the invention. As shown in FIG. 1, the display device 1 includes a display computing module 20, an audio computing module 30, and a light source device 40. The display computing module 20 is coupled to a signal source 10 and configured to receive an audio/video signal AV from the signal source 10. The audio computing module 30 is coupled to the display computing module 20 and configured to receive the audio/video signal AV from the display computing module 20 and to obtain sound information S. The sound information S includes orientation data. After the audio computing module 30 obtains the sound information S, the audio computing module 30 outputs the sound information S to the display computing module 20. For example, the display computing module 20 can be a Scalar integrated circuit (Scalar IC); the audio computing module 30 can be a digital signal processing integrated circuit (DSP IC). The audio/video signal AV includes an audio signal and a video signal. The display computing module 20 receives and decodes the packet of the audio/video signal AV, and then outputs it to the audio computing module 30. The audio computing module 30 obtains the sound information S from the audio signal and outputs the sound information S to the display computing module 20 through a communication bus, such as $I^2C$ (Inter-Integrated Circuit).

As shown in FIG. 1, the display computing module 20 generates a control signal C based on the sound information S and outputs the control signal C to the light source device 40, which is coupled to the display computing module 20. The light source device 40 has multiple light-emitting areas corresponding to the orientation data, and the light source device 40 controls the light-emitting status of at least one light-emitting area according to the control signal C. The sound information S obtained by the audio computing module 30 at different times may represent different orientations, such as left-hand side or right-hand side, and the display computing module 20 will modify the control signal C responsively. Therefore, the light-emitting status of the light-emitting areas of the light source device 40 can be changed according to the change of the sound information S to provide the user with the prompt effect.

Figure 2A:
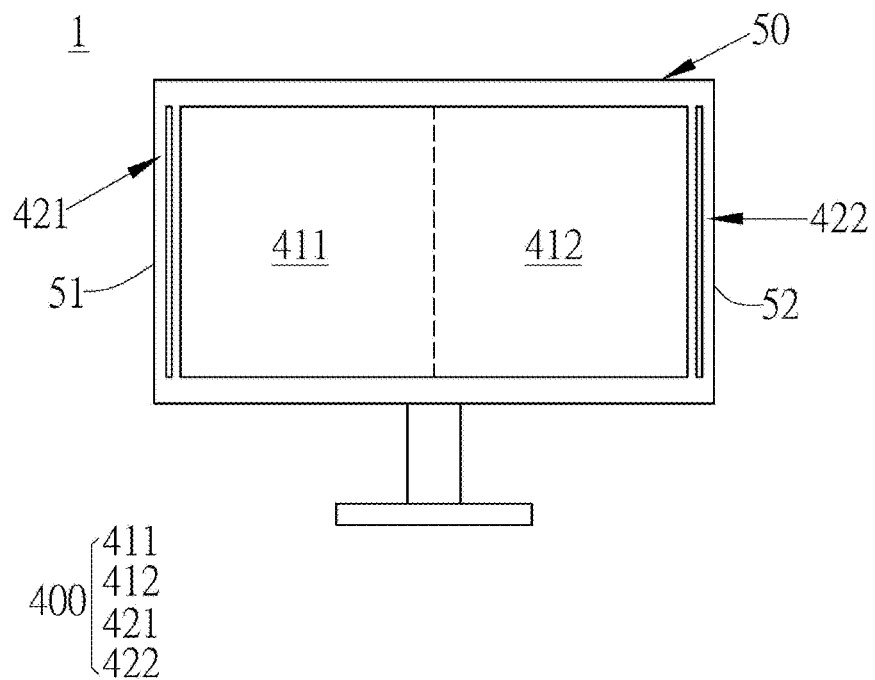
FIG. 2A is a schematic view of the display device of an embodiment of the invention.
Figure 2B:
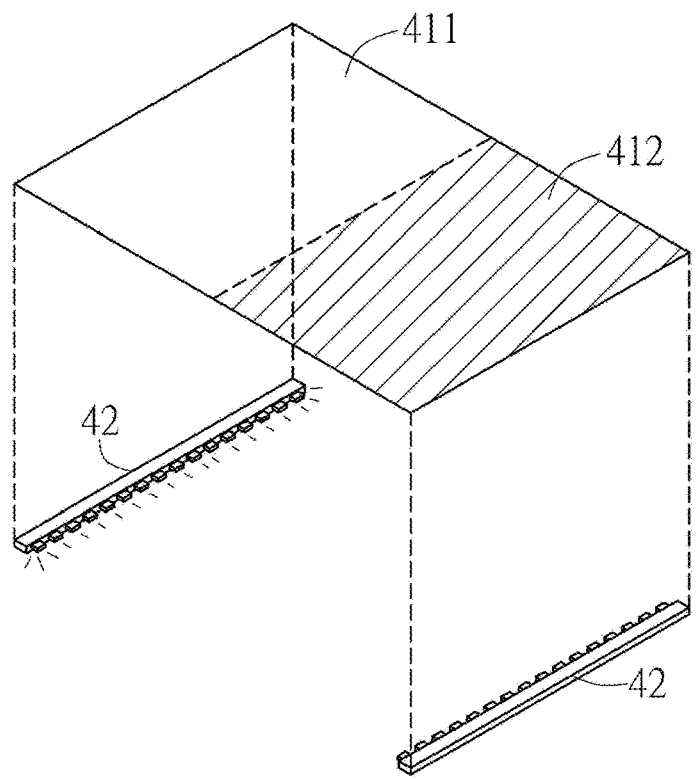
FIG. 2B is a schematic view of the backlight module of an embodiment of the invention.

Referring to FIGS. 2A and 2B, FIG. 2A is a schematic view of the display device 1 of an embodiment of the invention, and FIG. 2B is a schematic view of the backlight module 42 of an embodiment of the invention. In an embodiment, the light source device 40 can be a backlight module 42 disposed corresponding to the display area. As shown in FIG. 2A, a backlight area 400 of the backlight module 42 includes a first region 411 and a second region 412, which is different from the first region 411. The first region 411 corresponds to first direction information of the sound information. The second region 412 corresponds to second direction information of the sound information. The first direction information is different from the second direction information. The backlight module 42 controls display parameters of the first region 411 or the second region 412 according to the control signal. The display parameters can be brightness, flashing frequency, or the likes. Therefore, by switching the lighting status, the backlight module 42 can provide different degrees of brightness. The backlight module 42 may have, for example, a side-lighting structure. As shown in FIG. 2B, the backlight module 42 adopts a side-lighting technique. When the display computing module 20 receives the sound information having the first direction information and outputs the control signal, the backlight module 42 turns on the light source(s) near the first region 411 based on the control signal. Accordingly, the first region 411 is brighter than the second region 412. For the display screen, the display area may include different display sub-areas corresponding to the first region 411 and the second region 412, respectively. The brightness of these display sub-areas can be changed according to the change of the display parameters of the first region 411 and the second region 412. For the above embodiment, when the brightness of the first region 411 becomes brighter, the brightness of the display sub-area corresponding to the first region 411 is increased, so that the user can recognize the change of the display screen immediately and pay attention to the screen at the first region 411.

Furthermore, when the sound information S received by the audio computing module 30 (shown in FIG. 1) is changed, the display computing module 20 will change the control signal C accordingly. For example, when the display computing module 20 receives the sound information S having the first direction information and outputs the control signal C, the light source at the first region 411 is lightened. When the sound information S is changed from the first direction information to the second direction information, the display computing module 20 will change the control of the display parameters of the first region 411 and the second region 412 according to the change of the sound information S. For adjusting the brightness as an example, when the display computing module 20 receives the sound information S having the second direction information, the display computing module 20 correspondingly adjusts and outputs the control signal C, so that the light source at the first region 411 is not lightened and the light source at the second region 412 is lightened.

In an embodiment, in addition to the backlight module 42, the light source device 40 further includes a peripheral light source 44. As shown in FIGS. 1 and 2A, the peripheral light source 44 is disposed on a housing 50 around the display area. The peripheral light-emitting area 401 of the peripheral light source 44 includes a first marginal region 421 and a second marginal region 422 corresponding to a first side 51 and a second side 52 of the housing 50, respectively. Preferably, the peripheral light-emitting area 401 of the peripheral light source 44 is disposed on the housing 50 and faces toward the same side as the display area. The brightness of the first marginal region 421 varies with the brightness of the first region 411, and the brightness of the second marginal region 422 varies with the brightness of the second region 412. Moreover, the peripheral light source 44 and the backlight module 42 receive the control signal at the same time. In order to enhance the prompt effect, the light-emitting status of the peripheral light source 44 can vary with the light-emitting status of the backlight module 42. In addition, the light-emitting status of the peripheral light source 44 and the light-emitting status of the backlight module 42 can be changed simultaneously, but not limited thereto. For example, when the display computing module 20 receives the sound information having the second direction information and outputs a corresponding control signal, the light source of the backlight module 42 near the second region 412 is lightened according to the control signal, and the peripheral light source 44 at the second marginal region 422 is also lightened. Therefore, the prompt effect can be enhanced.

Figure 3A:
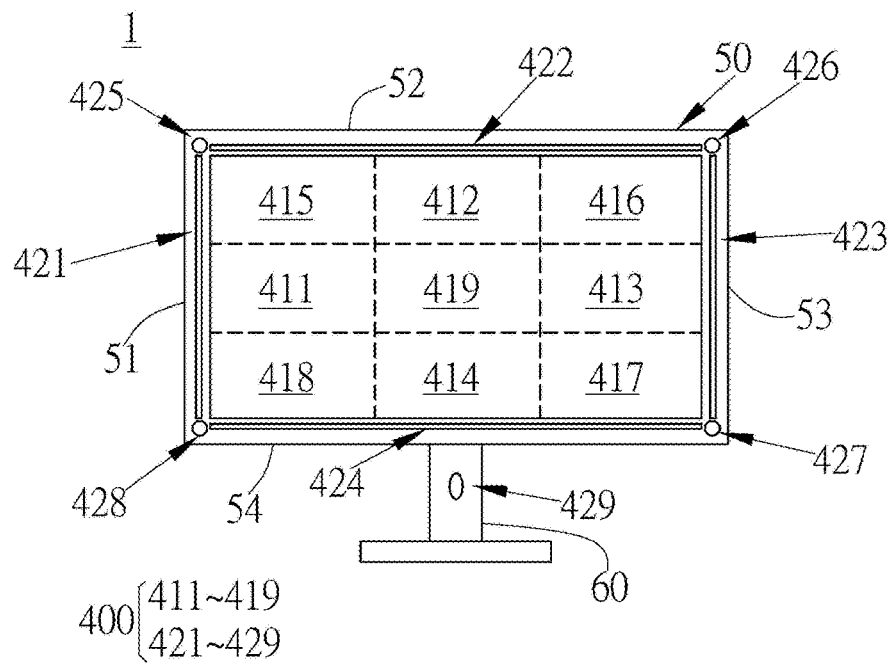
FIG. 3A is a schematic view of the display device of another embodiment of the invention.

Referring to FIG. 3A, FIG. 3A is a schematic view of the display device 1 of another embodiment of the invention. As shown in FIG. 3A, the peripheral light-emitting area 401 includes a corner region 425 corresponding to at least a corner of the housing 50, and the backlight area 400 further includes a third region 415. The third region 415 is disposed neighboring the corner region 425 much closer than the first region 411 and the second region 412. That is, compared to the first region 411 and the second region 412, the third region 415 is closer to the corner region 425. The third region 415 corresponds to third direction information of the sound information, and the brightness of the corner region 425 varies with the brightness of the third region 415. In other words, the backlight module 42 can be divided into a plurality of light-emitting regions with controllable display parameters, and corresponding to the division of the backlight module 42, the peripheral light source 44 is disposed at the edge and the corner of the housing, so that the prompt effect can be enhanced.

Specifically, as shown in FIG. 3A, the backlight module 42 further includes regions 413, 414, 416, 417, 418 and a central region 419, and the peripheral light source 44 further includes marginal regions 423, 424, corner regions 426, 427, 428, and an indication region 429. Each region corresponds to different direction information of the sound information to represent the sound from different orientations. For example, the first region 411 corresponds to the sound from the left-hand side, and the second region 412 corresponds to the sound from the front side. Similarly, the regions 413 and 414 correspond to the sound from the right-hand side and the sound from the rear side, respectively. The third region 415 and the regions 416, 417, 418 can correspond to the sound from the left front side, the right front side, the right rear side, and the left rear side, respectively.

The settings of the backlight area 400 and/or the light-emitting area 401 of the light source device 40 with respect to the sound orientation can be modified according to the decoding ability of the audio computing module 30 to the sound information. In another embodiment, the third region 415 can be set to correspond to the sound from the left-hand side and the front side. In other words, when the display computing module 20 receives the sound information including the left-hand side and the front side and outputs a corresponding control signal, the backlight module 42 enables the third region 415 and the corner region 425 to be lightened according to the control signal.

More specifically, the region 413 and the region 414 correspond to the side 53 and the side 54 of the housing, respectively. The brightness of the marginal region 423 varies with the brightness of the region 413, and the brightness of the marginal region 424 varies with the brightness of the region 414. The regions 416, 417, and 418 correspond to different corners of the housing 50, respectively. The brightness of the corner region 426 varies with the brightness of the region 416; the brightness of the corner region 427 varies with the brightness of the region 417; the brightness of the corner region 428 varies with the brightness of the region 418.

Moreover, the brightness of the indication region 429 varies with the brightness of the central region 419. As shown in FIG. 3A, the display device 1 further includes a bracket 60 connected to the housing 50. The peripheral light source 44 can be disposed at the edge and the corners of the housing 50 and on the bracket 60. As shown in FIG. 3A, the peripheral light-emitting area 401 includes an indication region 429 on the bracket 60. The central region 419 corresponds to the central location information of the sound information. The brightness of the indication region 429 varies with the brightness of the central region 419. For example, the central region 419 corresponds to the sound from the central location. When the display computing module 20 receives the sound information having the central location information and outputs the corresponding control signal, upon receiving the control signal, the light source device 40 enables the central region 419 and the indication region 429 to be lightened according to the control signal, so that the user can identify the source of the sound based on the lighting message.

Figure 3B:
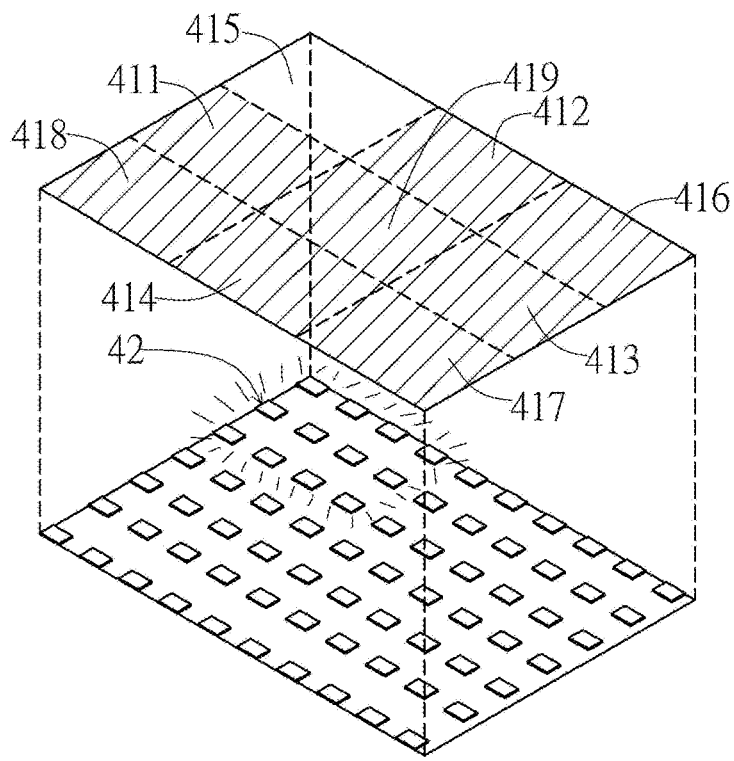
FIG. 3B is a schematic view of the backlight module of another embodiment of the invention.

The backlight module 42 can have, for example, a direct-lighting structure. As shown in FIG. 3B, FIG. 3B is a schematic view of the backlight module 42 of another embodiment of the invention. As shown in FIG. 3B, the backlight module 42 adopts a direct-lighting technique. When the display computing module 20 receives the sound information having the third direction information and outputs the corresponding control signal, the backlight module 42 turns on the light source(s) near the third region 415 based on the control signal. Accordingly, the third region 415 is brighter than the other regions. For example, light sources of the direct-lighting structure can be multiple micro light-emitting diodes (μLEDs). The backlight module 42 controls the brightness of the light-emitting areas by turning on/off some or all of the μLEDs based on the control signal.

Figure 4A:
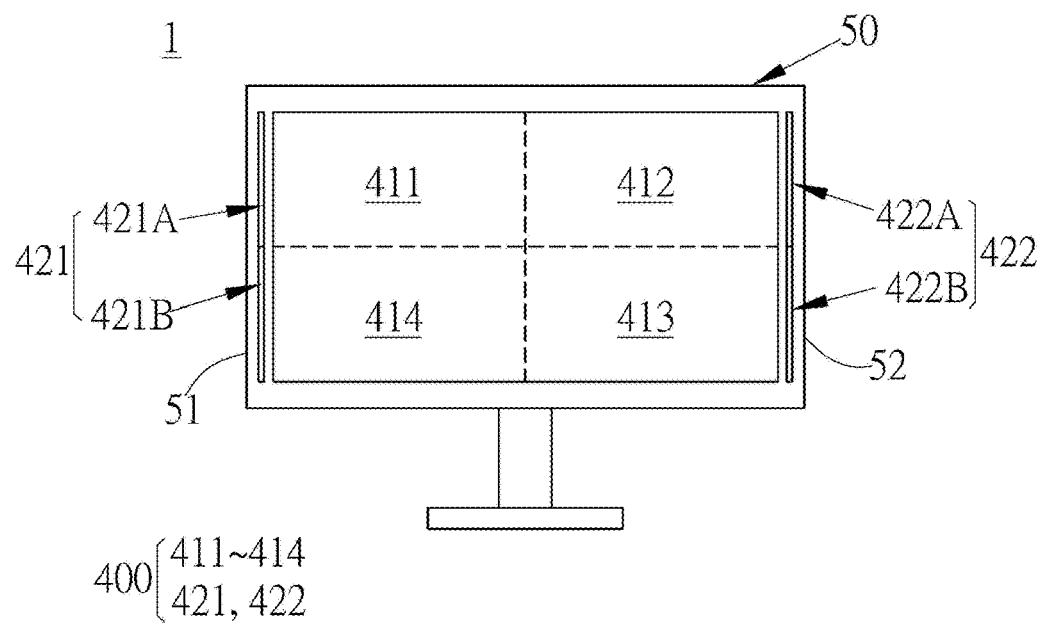
FIGS. 4A and 4B are schematic views of the display device of another embodiment of the invention.

FIG. 4A is a schematic view of the display device 1 of another embodiment of the invention. As shown in FIG. 4A, the backlight area 400 includes four regions (411-414), and the peripheral light-emitting area 401 includes a first marginal region 421 and a second marginal region 422. In this embodiment, light sources of the first marginal region 421 and the second marginal region 422 can be divided into a plurality of sections. As shown in FIG. 4A, the first marginal region 421 includes a first section 421A and a second section 421B along the first side 51, and the backlight module 42 includes the first region 411 and the fourth region 414 along the first side 51, wherein the fourth region 414 is connected to the first region 411 along the first side 51. The first region 411 corresponds to the first direction information of the sound information; the fourth region 414 corresponds to the fourth direction information of the sound information. The brightness of the first section 421A varies with the brightness of the first region 411, and the brightness of the second section 421B varies with the brightness of the fourth region 414. For example, the first region 411 corresponds to the sound from the left front side, and the fourth region 414 corresponds to the sound from the left rear side. When the display computing module 20 receives the sound information including the left rear side and outputs a corresponding control signal, the backlight module 42 turns on the fourth region 414 and the second section 421B according to the control signal.

Similarly, as shown in FIG. 4A, the second marginal region 422 includes sections 422A and 422B along the second side 52; the backlight module 42 includes the second region 412 and the region 413 along the second side 52, wherein the second region 412 is connected to the first region 411 along a direction perpendicular to the first side 51, and the region 413 is connected to the second region 412 along a direction parallel to the second side 52. The second region 412 and the region 413 correspond to different direction information of the sound information. For example, the second region 412 corresponds to the sound from the right front side, and the region 413 corresponds to the sound from the right rear side. The brightness of the section 422A varies with the brightness of the second region 412, and the brightness of the section 422B varies with the brightness of the region 413.

Figure 4B:
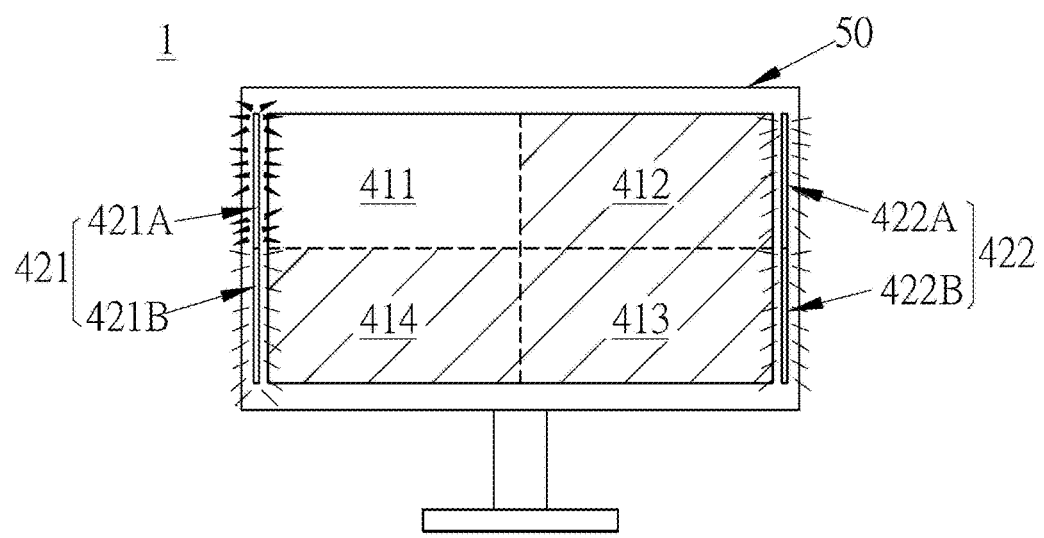

In another embodiment, the display parameters can be, for example, the adjustment of color tone. Referring to FIG. 4B, FIG. 4B is a schematic view of the display device 1 of another embodiment of the invention. As shown in FIG. 4B, when the display computing module 20 receives the sound information including non-directional sound, such as background music, the second region 412, the fourth region 414, and the region 413 are maintained to exhibit in a manner of regular tone, and the section 422A, the second section 421B, and the section 422B are also maintained to exhibit in a manner of regular tone. Moreover, when the display computing module 20 receives the sound information including the left front side and outputs a corresponding control signal, the backlight module 42 enables the first region 411 and the first section 421A to exhibit in a manner of warning tone according to the control signal. Specifically, the backlight module 42 can display the warning tone in warm color, such as orange, yellow, and also can prompt the user by displaying a reddish screen or flashing the screen.

In another embodiment, one of the backlight module 42 and the peripheral light source 44 can be selected for adjustment of the tone parameter. In other words, the light source device 40 can make different parameter adjustments for the backlight module 42 and the peripheral light source 44 according to the control signal. For example, the light source device 40 can adjust the brightness parameter of the backlight module 42 based on the control signal and adjust the tone parameter of the peripheral light source 44 based on the control signal at the same time. For example, when the brightness of the first region 411 is increased, the first section 421A of the peripheral light source 44 is changed from the regular tone to the warning tone.

In another embodiment, the display computing module 20 can adjust the control signal according to the sound information and the sound type. In other words, the sound information further includes sound type data. The light source device 40 controls the flashing frequency of at least one light-emitting area according to the control signal. For example, when the user/player uses the display device 1 of the invention to play a shooting game, the gunshot sound can be set at a regular flashing frequency, and the bombing sound can be set at an increased flashing frequency. When the display computing module 20 receives the sound information including gunshot sound from the left front side and bombing sound from the right front side and outputs a corresponding control signal, the light source device 40 can increase the brightness of the first section 421A (see FIG. 4B) of the peripheral light source 44 without changing the flashing frequency, and increase the brightness and the flashing frequency of the section 422A of the peripheral light source 44 according to the control signal. Therefore, the prompt effect can be provided according to different sound type data to effectively improve the user experience.

Figure 5:
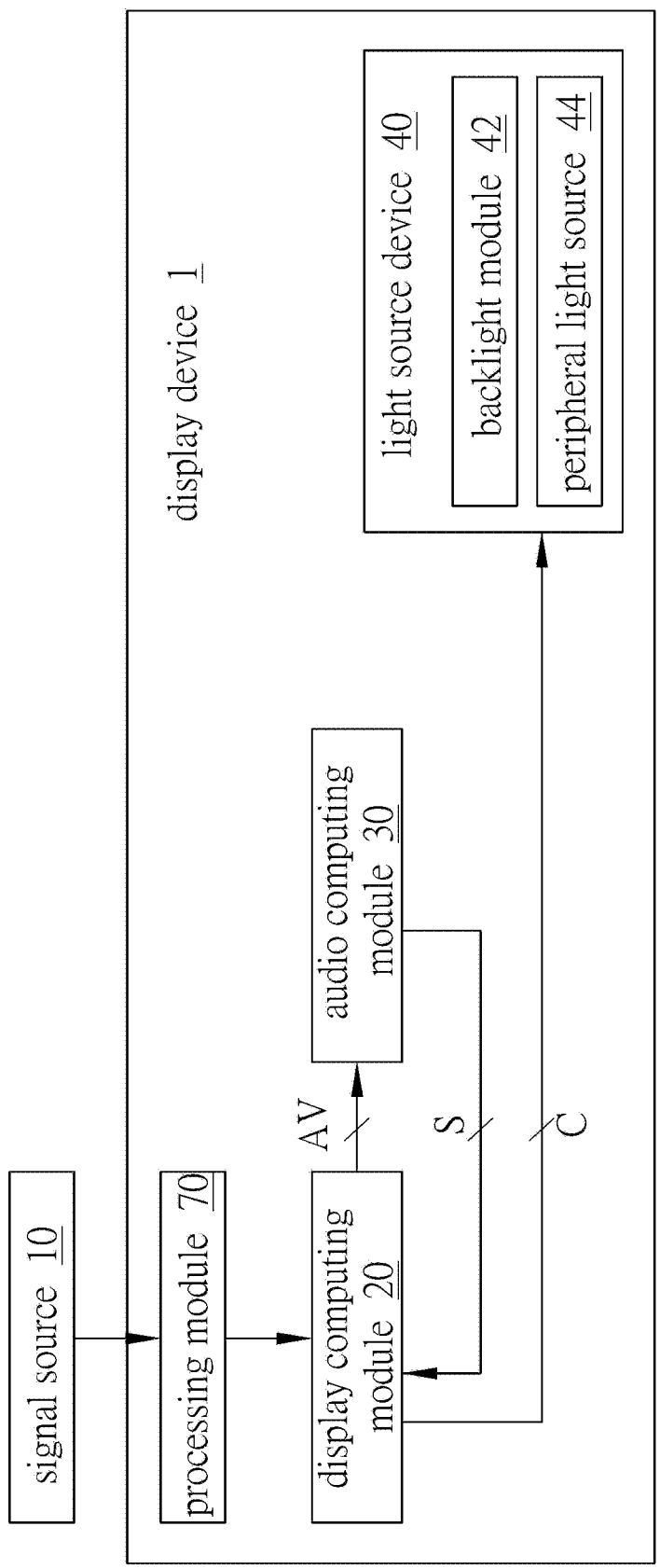
FIG. 5 is a block diagram of the display device of another embodiment of the invention.

Referring to FIG. 5, FIG. 5 is a block diagram of the display device of another embodiment of the invention. As shown in FIG. 5, the display device 1 includes a display computing module 20, an audio computing module 30, a light source device 40, and a processing module 70. The display computing module 20 is coupled to the signal source 10 and configured to receive the audio/video signal from the signal source 10 through the processing module 70. The audio computing module 30 is configured to receive the audio/video signal AV from the display computing module 20 and to obtain the sound information S, which includes orientation data. After the audio computing module 30 obtains the sound information S, the sound information S is outputted to the display computing module 20. In this embodiment, the signal source 10 can be, for example, a display card coupled to the processing module 70. In another embodiment, the signal source 10 can be a multimedia program executed by the processing module 70.

As shown in FIG. 5, the display computing module 20 generates the control signal C according to the sound information S and outputs the control signal C to the light source device 40. The light source device 40 includes multiple light-emitting areas corresponding to the orientation data, and the light source device 40 is configured to control the light-emitting status of at least one light-emitting area according to the control signal C. The sound information S obtained by the audio computing module 30 at different times may represent different orientations, such as left-hand side or right-hand side, and the display computing module 20 will change the control signal C responsively. Therefore, the light-emitting areas of the light source device 40 can change the light-emitting status of each light-emitting area according to the change of the sound information S to provide the user with the prompt effect.

Figure 6:
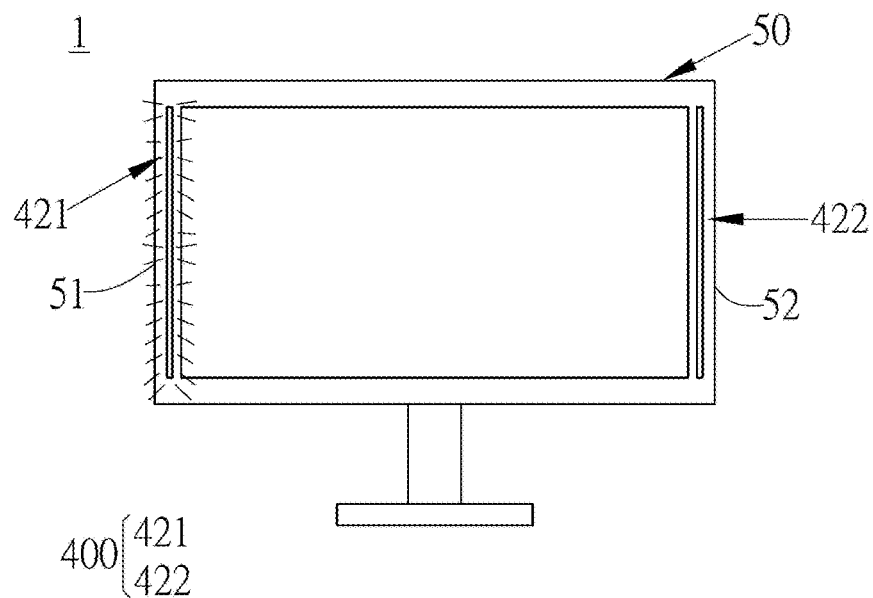
FIGS. 6 to 8B are schematic views of the display device of another embodiment of the invention.

Referring to FIG. 6, FIG. 6 is a schematic view of the display device 1 of another embodiment of the invention. In this embodiment, the light source device 40 can be a peripheral light source 44 disposed on the housing 50 around the display area. As shown in FIG. 6, the peripheral light-emitting area 401 of the peripheral light source 44 includes the first marginal region 421 and the second marginal region 422 corresponding to the first side 51 and the second side 52 of the housing 50, respectively. The first marginal region 421 corresponds to the first direction information of the sound information, and the second marginal region 422 corresponds to the second direction information of the sound information. The display parameters of peripheral light sources 44 at the first marginal region 421 and the second marginal region 422 are changed according to the control signal. For the change of brightness as an example, by switching the lighting status of the peripheral light source(s) 44, different degrees of brightness can be achieved. For example, when the display computing module 20 receives the sound information having the first direction information, such as sound from the left-hand side and outputs a corresponding control signal, the light source device 40 lightens the peripheral light sources 44 at the first marginal region 421 according to the control signal. Therefore, the first marginal region 421 is brighter than the second marginal region 422.

Figure 7:
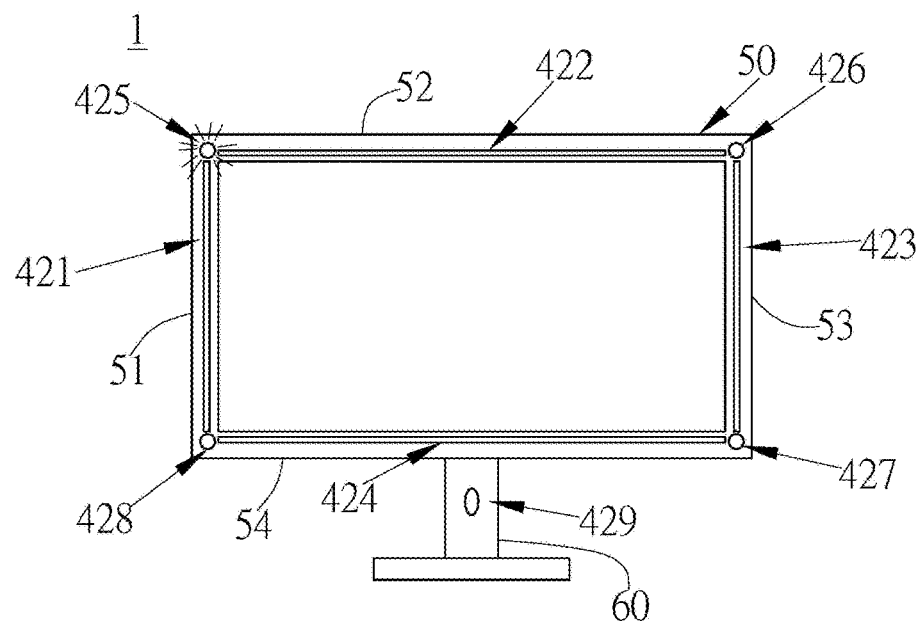

Referring to FIG. 7, FIG. 7 is a schematic view of the display device 1 of another embodiment of the invention. As shown in FIG. 7, the peripheral light-emitting area 401 includes a corner region 425 corresponding to at least a corner of the housing 50. The corner region 425 is located at the corner between the first marginal region 421 and the second marginal region 422, which is adjacent to the first marginal region 421. The corner region 425 corresponds to third direction information of the sound information, and the display parameters of the peripheral light source(s) 44 at the corner region 425 are changed according to the control signal. In other words, the peripheral light sources 44 can be divided into a plurality of light-emitting regions with controllable display parameters, so that the prompt effect can be enhanced.

As shown in FIG. 7, in addition to the first marginal region 421 and the second marginal region 422, the peripheral light source 44 further includes marginal regions 423, 424, corner regions 426, 427, 428, and an indication region 429. Each region corresponds to different direction information of the sound information to represent the sound from different orientations. For example, the first marginal region 421 corresponds to the sound from the left-hand side, and the second marginal region 422 corresponds to the sound from the front side. Similarly, the marginal regions 423 and 424 correspond to the sound from the right-hand side and the sound from the rear side, respectively. The corner regions 425, 426, 427, 428 can correspond to sounds from the left front side, the right front side, the right rear side, and the left rear side, respectively. The settings of the backlight area 400 and/or the light-emitting area 401 of the light source device 40 with respect to the sound orientation can be modified according to the decoding ability of the audio computing module 30 to the sound information. In another embodiment, the corner region 425 can be set to correspond to the sound from the left-hand side and the front side. In other words, when the display computing module 20 receives the sound information including the left-hand side and the front side and outputs the corresponding control signal, the light source device 40 enables the corner region 425 to be lightened according to the control signal.

Moreover, as shown in FIG. 7, the display device 1 further includes a bracket 60 connected to the housing 50. The peripheral light source 44 can be disposed at the edge and the corners of the housing 50 and on the bracket 60. As shown in FIG. 7, the peripheral light-emitting area 401 includes an indication region 429 on the bracket 60. The indication region 429 corresponds to the central location information of the sound information. For adjusting the brightness of the display parameters as an example, the indication region 429 corresponds to the sound from the central location. When the display computing module 20 receives the sound information having the central location information and outputs the corresponding control signal, upon receiving the control signal, the light source device 40 enables the indication region 429 to be lightened according to the control signal.

Figure 8A:
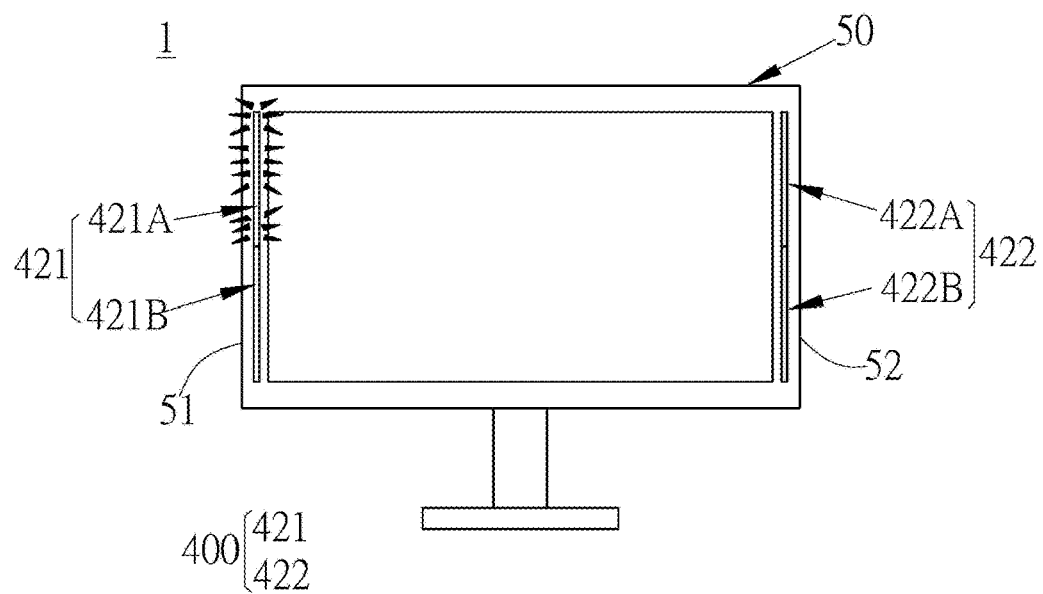
Figure 8B:
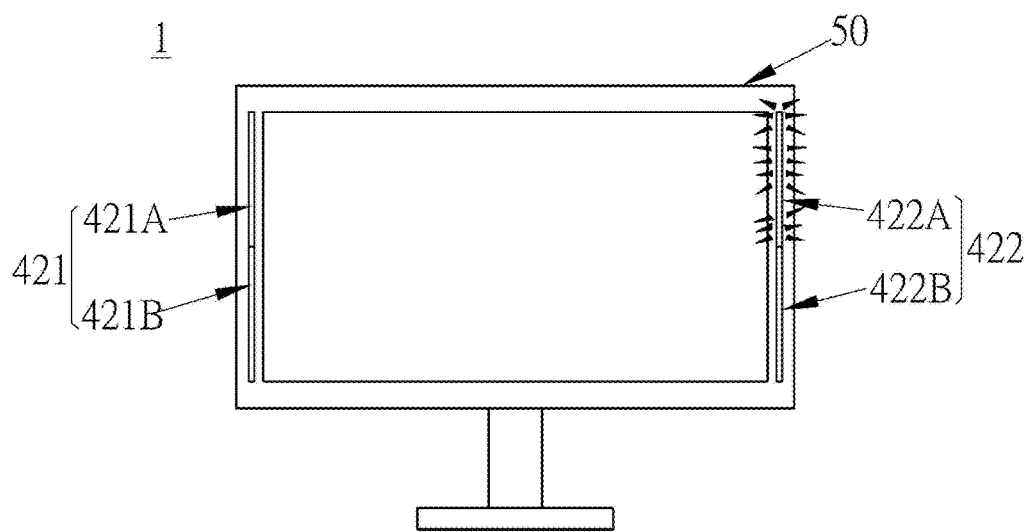

As shown in FIGS. 8A and 8B, FIGS. 8A and 8B are schematic views of the display device 1 of another embodiment of the invention. As shown in FIG. 8A, the peripheral light-emitting area 401 includes the first marginal region 421 and the second marginal region 422. In this embodiment, light sources of the first marginal region 421 and the second marginal region 422 can be divided into a plurality of sections. As shown in FIG. 8A, the first marginal region 421 includes the first section 421A and the second section 421B along the first side 51. The first section 421A corresponds to the first direction information of the sound information; the second section 421B corresponds to the second direction information of the sound information. The display parameters of the peripheral light sources 44 at the first section 421A and the second section 421B are changed according to the control signal. For example, the first section 421A corresponds to the sound from the left front side, and the second section 421B corresponds to the sound from the left rear side. When the display computing module 20 receives the sound information including the left rear side and outputs a corresponding control signal, the light source device 40 turns on the second section 421B according to the control signal.

Similarly, as shown in FIG. 8A, the second marginal region 422 includes sections 422A and 422B along the second side 52. The sections 422A and 422B correspond to different direction information of the sound information. For example, the section 422A corresponds to the sound from the right front side, and the section 422B corresponds to the sound from the right rear side. The display parameters of peripheral light sources 44 at the section 422A and the section 422B are changed according to the control signal.

As mentioned above, the light source device 40 can not only adjust the display parameters of brightness, but also the display parameters of color tone. In addition, the prompt can be provided in a different manner according to the sound type to exhibit different prompt effect, which will not be elaborated again.

It is noted that FIGS. 8A and 8B are schematic views of the display device 1 under different lighting statuses. When the sound information received by the audio computing module 30 is changed, the display computing module 20 will change the control signal responsively. As shown in FIG. 8A, when the display computing module 20 receives the sound information including the first direction information and outputs a corresponding control signal, peripheral light sources 44 at the first section 421A can be lightened. When the sound information is change from the first direction information to the second direction information, the display computing module 20 changes the control of display parameters of the first section 421A and the section 422A according to the change of the sound information. As shown in FIG. 8B, when the display computing module 20 receives the sound information including the second direction information and adjusts the control signal to a corresponding control signal, peripheral light sources 44 at the first section 421A are not lightened and peripheral light sources 44 at the section 422A can be lightened.

The display computing module 20 and the audio computing module 30 of the display device 1 of the invention can generate the corresponding control signal based on the audio/video signal of the signal source, so that the light-emitting status of the light source device 40 of the display device 1 can be adjusted according to the control signal. Therefore, according to the light-emitting status, the user is prompted by the direction of sound source and/or the sound type. Specifically, the light source device 40 can provide the light-emitting status of different brightness and/or different flashing frequencies based on the control signal, to provide the user a more instinct, specific prompt without affecting the existing display screen to promote the user experience.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A display device, comprising:
   a display computing module coupled to a signal source and configured to receive an audio/video signal from the signal source;
   an audio computing module coupled to the display computing module, the audio computing module configured to receive the audio/video signal from the display computing module and to obtain sound information comprising orientation data, the audio computing module outputting the sound information to enable the display computing module to generate a control signal based on the sound information; and
   a light source device coupled to the display computing module, the light source device comprising multiple light-emitting areas corresponding to the orientation data, the light source device configured to control a light-emitting status of at least one of the light-emitting areas according to the control signal.

2. The display device of claim 1, wherein the light source device comprises a backlight module disposed corresponding to a display area; a backlight area of the backlight module comprises a first region and a second region different from the first region; the first region corresponds to first direction information of the sound information; the second region corresponds to second direction information of the sound information; the first direction information is different from the second direction information; the backlight module controls display parameters of the first region or the second region according to the control signal.

3. The display device of claim 2, wherein when the sound information is changed from the first direction information to the second direction information, the display computing module changes the control of the display parameters of the first region and the second region according to the change of the sound information.

4. The display device of claim 2, wherein the light source device further comprises:
   a peripheral light source disposed on a housing around the display area, wherein a peripheral light-emitting area of the peripheral light source comprises a first marginal region and a second marginal region corresponding to a first side and a second side of the housing, respectively,
   wherein a brightness of the first marginal region varies with a brightness of the first region, and a brightness of the second marginal region varies with a brightness of the second region.

5. The display device of claim 4, wherein the peripheral light-emitting area further comprises:
   a corner region corresponding to at least a corner of the housing,
   wherein the backlight area further comprises a third region disposed neighboring the corner region; the third region corresponds to third direction information of the sound information; a brightness of the corner region varies with a brightness of the third region.

6. The display device of claim 4, wherein the first marginal region comprises a first section and a second section along the first side; the backlight area further comprises a fourth region connected to the first region along the first side; the fourth region corresponds to fourth direction information of the sound information; a brightness of the first section varies with the brightness of the first region, and a brightness of the second section varies with a brightness of the fourth region.

7. The display device of claim 6, wherein the peripheral light source is configured to display a regular tone and/or a warning tone; when the brightness of the first region increases, the first section of the first marginal region is changed from the regular tone to the warning tone.

8. The display device of claim 4, wherein the display device further comprises:
   a bracket connected to the housing,
   wherein the peripheral light source is disposed on the housing and the bracket; the peripheral light-emitting area comprises an indication region on the bracket; the backlight area comprises a central region corresponding to central location information of the sound information; a brightness of the indication region varies with a brightness of the central region.

9. The display device of claim 1, wherein the sound information further comprises:

sound type data, wherein the display computing module generates the control signal according to the sound type data to enable the light source device to control a flashing frequency of at least one light-emitting area based on the control signal.

10. The display device of claim 1, wherein the light source device comprises:
a peripheral light source disposed on a housing around the display area, wherein a peripheral light-emitting area of the peripheral light source comprises a first marginal region and a second marginal region corresponding to a first side and a second side of the housing, respectively,
wherein the first marginal region corresponds to first direction information of the sound information; the second marginal region corresponds to a second direction information of the sound information; display parameters of the first marginal region and/or the second marginal region are varied according to the control signal.

11. The display device of claim 10, wherein the peripheral light-emitting area further comprises:
a corner region corresponding to at least a corner of the housing,
wherein the corner region corresponds to third direction information of the sound information, and display parameters of the corner region are varied according to the control signal.

12. The display device of claim 10, wherein the first marginal region comprises a first section and a second section along the first side; the first section corresponds to first direction information of the sound information; the second section corresponds to second direction information of the sound information, and display parameters of the first section and the second section are varied according to the control signal.

13. The display device of claim 12, wherein the peripheral light source is configured to display a regular tone and/or a warning tone; when the light source device receives the control signal, the first section of the first marginal region is changed from the regular tone to the warning tone.

14. The display device of claim 10, further comprising:
a bracket connected to the housing,
wherein the peripheral light source is disposed on the housing and the bracket; the peripheral light-emitting area comprises an indication region on the bracket; the indication region corresponds to central location information of the sound information, and display parameters of the indication region are varied according to the control signal.

15. The display device of claim 1, wherein the audio/video signal comprises:
a video signal and/or an audio signal, wherein after the audio computing module obtains the sound information from the audio signal, the sound information is sent to the display computing module through a communication bus.

* * * * *